Oct. 5, 1965

W. H. PAYNE 3,209,674

FOOD FERMENTATION VAT COVER

Filed Jan. 4, 1965

INVENTOR.
William H. Payne

BY

B. B. Olive
ATTORNEY

United States Patent Office 3,209,674
Patented Oct. 5, 1965

3,209,674
FOOD FERMENTATION VAT COVER
William H. Payne, Raleigh, N.C., assignor to Payne & Associates, Inc., a corporation of North Carolina
Filed Jan. 4, 1965, Ser. No. 423,272
2 Claims. (Cl. 99—254)

This invention relates to vat covers and particularly to covers such as are employed for covering vegetable fermentation vats of the kind employed in the pickle, sauerkraut, cocktail onion and similar food industries.

In the pickle industry which is used as a typical application to explain the invention, vast numbers of open top, cylindrical, wooden stave vats are employed to hold the brine solution and cucumbers during fermentation. The vats are large and may range fourteen feet or larger in diameter. Suitable covers for vats of this kind have never been provided and the industry has long suffered the introduction of foreign matter in the form of gnats, flies, leaves, bird droppings and the like. Rain also enters the vats and dilutes the brine. Such impurities have caused spoilage and waste and have created a purity and sanitation problem which has only recently received the serious attention of governmental agencies charged with supervision of food handling industries.

Some relief from the problem has been obtained by use in the industry of large wooden covers essentially in the form of wooden discs which have been placed on top of the pickles during fermentation. However, such covers have not given tight fits and impurities as well as rain have still been introduced. Furthermore, since the fermentation process inherently involves the creation of various gases, particularly carbon dioxide, such gases have sometimes caused the wooden covers to split or break even though reinforced with heavy timbers. Because of these fermentation gases, it is sometimes the practice to install the wooden covers only after the gas generation aspect of fermentation has become dormant. Such practice eliminates the problem of the covers breaking and splitting but it gives maximum opportunity for the mentioned foreign matter to find its way into the vat.

Another disadvantage with the conventional wooden cover resides in the fact that sampling of the brine usually requires either removal or prying up the heavy wooden cover. Such procedure sometimes allows foreign matter to enter and is awkward and time consuming since periodic sampling of the brine for purpose of visual inspection and chemical analysis is frequently required. It may also be noted that since the heavy wooden covers are not floated on the surface of the brine but rather are supported above the surface of the brine, air is trapped between the cover and the brine and it is this trapped air that is known to encourage the growth of aerobic bacteria under the vat cover. Wooden covers are also subject to dry rot and sometimes contribute to changing the odor or flavor of the vegetable matter which is undesirable. Considering that a large pickle producing plant may have a hundred or more vats at one installation, the many disadvantages of wooden disc type covers are readily seen.

A general object of the invention is therefore to provide a vat cover for vegetable fermentation vats which is suitable to full time employment on the vat.

Another object is to provide a light-weight vegetable fermentation vat cover which is easily installed and removed.

Another object is to provide a vegetable fermentation vat cover which can be reused and easily cleaned and stored when not in use.

Another object is to provide a vegetable fermentation vat cover having convenient means for taking brine samples and which does not require removal of the cover from the vat.

Another object is to provide a vegetable fermentation vat cover having pressure relief means such that the cover may remain in place during the fermentation period.

Another object is to provide for a vegetable fermentation vat cover a simple, inexpensive and easy-to-produce pressure relief valve.

Another object is to provide a vegetable fermentation vat cover which can be floated on the brine surface, and submersed in a covering liquid to inhibit the growth of aerobic bacteria.

An object is also that of providing a vegetable fermentation vat cover which is chemically inert to vegetable fermentation brines and the like and which imparts no flavor or odor change or leaching effect to the same.

The foregoing and other objects of the invention will become apparent in connection with the following description and drawings in which like numerals designate corresponding parts throughout the several views.

FIGURE 4 is a sectional elevation view taken on line 5—5 of FIGURE 4.

In general, the cover of the invention can be said to comprise a disc shaped impervious, thin, flexible, elastomeric coated fabric having a pressure relief valve, preferably in the center of the disc, an opening through the fabric which can be positioned over the brine sampling slot and which can be closed off when not in use, and releasable means to secure the cover to the inside wall of the vat during fermentation. In the preferred embodiment of the invention as disclosed herein the cover is made of a vinyl-coated nylon fabric meeting United States Government specifications. The referred to relief valve is made up of three layers of the same fabric which are originally cut to the same size small disc shape following which a similar size section is cut off each disc. The discs are then secured together in a manner later explained such that pressure will force them apart. The sampling slot opening which is referred to is provided by a collapsible tubular sleeve which is secured to the edge of a hole in the cover and which is unfolded when not in use and is folded and secured by a suitable clamp such as a clothes pin when not in use. The cover is secured by means of a somewhat flexible tube which fits in a groove carved in the inside wall of the vat and which catches the fabric cover between the tube and the wall. Double headed nails are employed to hold the tube. The details of the cover of the invention will next be explained after which the description turns to the manner in which the cover is employed.

Figure 1:
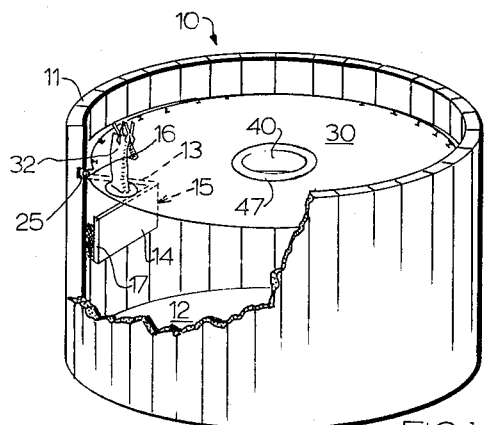
FIGURE 1 is a cut-away perspective of a vegetable fermentation vat having a cover of the type which embodies the invention.
Figure 4:
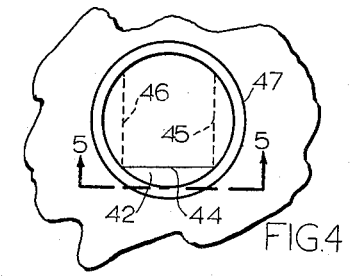
FIGURE 4 is an enlarged fragmentary plan view of the pressure relief valve portion of the cover.
Figure 5:
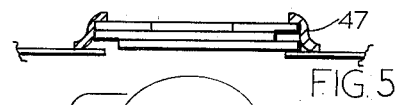
Figure 2:
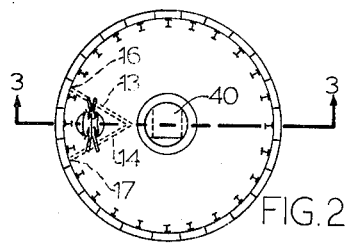
FIGURE 2 is a plan view on a reduced scale of the vegetable fermentation vat shown in FIGURE 1.
Figure 3:
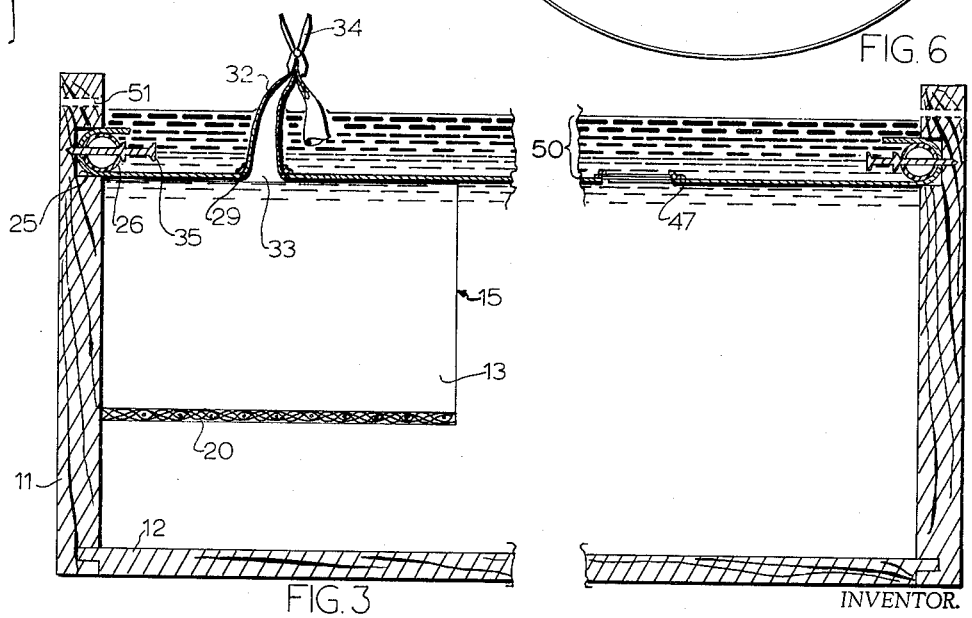
FIGURE 3 is a sectional elevation view taken on line 3—3 of FIGURE 2.

As previously mentioned, the pickle industry and the typical large wooden pickle fermentation vat are used to illustrate the invention. As best illustrated in FIGURES 1, 2 and 3 the vat, generally designated at 10, has an open top and is made of a plurality of vertically positioned wooden staves 11 secured to a bottom structure 12. While not shown, it will be appreciated that the staves in large vats of this kind are normally secured together by bands, cables or the like and have means to adjust the tension in such bands or cables. In order to provide a convenient place from which brine may be taken for sampling, there is employed a pair of vertical board members 13, 14 which are joined together along one vertical edge as indicated at 15 and which have their respective opposite vertical edges secured at laterally spaced positions as at 16, 17 to the inside wall of vat 10. A suitable mesh screen 20 is secured to the bottom of the "sampling slot" structure formed by the board members 13, 14 and the portion of the inside vat wall enclosed by these members. According to conventional practice in the pickle industry, the brine which is filtered by screen 20 and confined within the "sampling slot" enclosure is used for sampling purposes. The cover of the invention may nevertheless be employed in vats not having such enclosure.

The foregoing described vat structure is generally that to be found through out the pickle industry. While not indicated in the drawings, it is usually the case that the tops of the staves are uneven and rough and due to slight shifting of the staves it is frequently the case that the inside wall of the vat is uneven. Even though the cover of the invention can be employed with the typical vat in the condition described it is desirable that a continuous groove 25 be provided in the inside wall of the vat 10. As will be apparent from later description groove 25 should be level and should be sized to accommodate the holding tube 26 later referred to. In vats of the type to which the invention has been applied the groove 25 is cut about three inches below the top of the vat and, when the staves are in reasonably good alignment, is cut shallow, the depth of the groove being emphasized in the drawing for purpose of illustration. In any event it may be noted that with the exception of the simple and inexpensive grooving modification the conventional vat lends itself to immediate use of the cover of the invention.

The cover of the invention as illustrated by the representative embodiment shown in the drawings and generally designated by the numeral 30 comprises a main body portion 31 formed of coated fabric in the shape of a disc whose diameter exceeds the internal diameter of the vat 10 with which the cover 30 is to be employed. A tubular coated fabric sleeve 32 is secured at one end by a sealing tape 29 to the edge of a hole 33 cut through the body portion 31 and which in use is located so as to be positionable over the previously mentioned sampling slot structure. Sleeve 32 because of its flexibility can be easily folded and secured together by a suitable clamp such as the clamp 34 which in practice may be a clothes pin or the like. The body portion 31 is secured to the vat 10 by being pulled between the holding tube 26 and the groove 25 cut in the inside wall of vat 10. Tube 26 is preferably formed of a flexible lightweight plastic and is made as a continuous ring having an outside diameter slightly larger than the inside diameter of vat 10 such that when tube 26 is installed it will tend to compress itself into groove 25. A one-inch outside diameter, polystyrene, hollow tube with a one-eighth inch wall thickness has been found suitable. After tube 26 has been placed in position and the peripheral edges of the body portion 31 are lapped around tube 26 as shown in FIGURE 3, a plurality of double headed nails 35 are driven through tube 26 into the groove 25 formed in the staves 11 making up vat 10. While other fastening means might be employed double headed nails facilitate the easy removal of tube 26 and cover 30.

Figure 6:
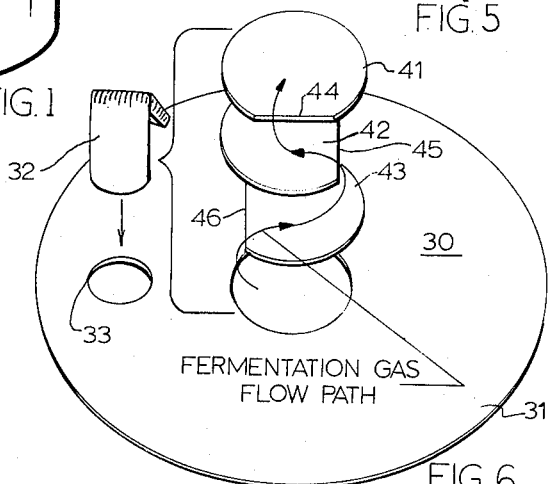
FIGURE 6 is an exploded perspective view of the cover body, sleeve and the pressure relief valve elements.

The problem of pressure relief has been mentioned and to this end the invention provides a unique pressure relief valve structure, generally designated 40, which lends itself to the same sheet fabric type of manufacture employed in the main body structure of the cover. Thus, the same general manufacturing facilities as are employed to make the sleeve 32 and the body portion 31 may be employed to make the relief valve, generally designated by 40, of the invention. Valve 40 is formed of three similar shaped pieces, 41, 42 and 43 each of which is originally cut in the shape of a small disc from which there is removed a piece coresponding to a cut taken along a chord line. While various materials are suited to the purpose a six-inch diameter, three-mil thick neoprene sheet stock has proven satisfactory in use. Disc pieces 41, 42, 43 are then superimposed one above the other with the corresponding cut edges 44, 45, 46 oriented as best shown in FIGURE 6. A suitable sealing tape 47 is then secured around the assembled disc pieces to retain them in such position. In use, the pieces 41, 42, 43 will remain flat one on top of the other and will prevent flow in either direction. However when fermentation gas pressure builds up in a sufficient amount below the cover the pressure will lift the valve pieces and will allow the gas to seek a path generally as indicated by the back and forth flow line shown in FIGURE 6. More or less than three valve pieces may be employed and the pieces may be shaped in some shape other than that indicated. The important aspect of this feature of the invention is that each piece cover less than the area of the hole in which the valve is mounted and that the pieces be oriented with respect to each other so that the area which is not covered by one piece is covered by the next piece above and finally that the mating surfaces of the valve pieces not be cemented together so that under the influence of pressure the pieces will be allowed to separate and release the gas forming the pressure. It should also be stated that any one way valve would provide the needed pressure relief so long as it was designed for the proper pressure. Furthermore, several valves rather than a single valve could be employed. However, the very simple valve structure illustrated by the drawings is simple and has the important advantage of being able to use the same manufacturing facility which is employed to make the other cover elements.

In use, the cucumbers are placed in the vat along with the appropriate quantity and concentration of brine sufficient to bring the brine level up to the level of groove 25. The cover 30 is then floated on top of the brine and the holding tube 26 is positioned in the groove 25 with the edge of the cover body portion 31 caught between the tube and the groove and pulled up around the tube to make the cover reasonably taut. The double headed nails 35 are then driven through the tube 26 into the staves 11 at about 18-inch intervals for a ten-foot tank and at smaller intervals for a large tank. When positioning the cover, sleeve 32 is of course positioned over the sampling slot. During installation sleeve 32 is unrolled in order to allow any air trapped under the cover to escape through the sleeve after which it is rolled up and clamped by the clamp, e.g., a clothespin, 34. The vat volume above the cover is next flooded with a "topping brine" or water until the vat is full as represented at 50 in FIGURE 3. This topping brine serves the purpose of keeping the cover 30 positioned on the vat brine, of preventing air becoming trapped beneath the cover particularly near the vat wall where the fabric sometimes puckers and of providing a vehicle for trapping any debris that falls on the vat. Such debris can periodically be swept out through suitable weep holes as indicated at 51.

In summary, it will be seen that the cover of the invention meets the unique conditions faced in the pickle and similar industries. Aside from meeting each of the objects stated, it is also pointed out that by effectively sealing off the vat brine from rain, snow, sleet and other forms of atmospheric moisture the salinity of the brine is preserved thus producing significant savings in use of salt. Furthermore, even though the vats with which the invention covers are to be employed are old and the staves misaligned, the grooving procedure insures the adaptability of the invention covers to such vats.

While a specific embodiment has been discussed and explained in detail it will be apparent that those skilled in the art may vary the construction described without departing from the spirit and scope of the invention as hereafter claimed.

What is claimed and is desired to be secured by Letters Patent of the United States is:

1. In combination in an open top fermentation vat having vegetable and fermentation liquid contents in process therein and having a wooden vertical side wall provided with a continuous groove formed in a level plane in the inside surface of said wall below said top, a sampling slot structure secured to said wall below said groove, a cover for said vat comprising a circular disc shaped elastomeric coated fabric effectively floated on said contents and occupying the whole of said plane bounded by said groove, said fabric including a pair of apertures positioned respectively over said structure and the center of said vat, a covering layer of liquid above said cover and below said top, a foldable elastomeric coated fabric sleeve having one end secured to said cover fabric around said structure aperture in communication with said contents and the other end extendible upward through said liquid, clamp means for securing said upward end closed, pressure relief valve means mounted in said central aperture and comprising a plurality of superimposed disc pieces of uniform shape mounted together in said central aperture, said aperture being of greater area than said shape and said shape being designed and the orientation of said disc pieces with respect to each other being arranged such that said pieces collectively seal said central aperture below some predetermined pressure and above said pressure open and provide a pressure relief flow path therethrough, resilient ring means formed of a material penetratable by nails and being mounted in said plane and engaging the edge of said fabric in said groove, and a plurality of double headed nails secured through said ring means and said edge and engaging said wall to hold the same secure in said groove.

2. In combination with an open top fermentation vat having a vertical side wall and a sampling slot structure secured to said wall below the top thereof and having vegetable and fermentation liquid contents in process therein, a circular disc shaped cover having its edge releasably secured to the inside surface of said wall and being effectively floated on said contents, a one way pressure relief valve mounted in said cover, said pressure relief valve comprising a plurality of superimposed disc pieces of uniform shape mounted together in a port formed in said cover, said port having an area greater than the area of said shape, said shape being designed and the orientation of said disc pieces with respect to each other being arranged such that said pieces collectively seal said port below said pressure and above said pressure provide a flow path to relieve the same, a covering layer of liquid above said cover and below said top, and a closeable, collapsible elastomeric coated fabric sleeve having one end secured to said cover and communicating with said contents and the other end extendable upward through said layer of liquid.

References Cited by the Examiner

UNITED STATES PATENTS

| 1,265,130 | 5/18 | Staley | 99—156 |
| 1,694,016 | 12/28 | Kresbach | 20—1.4 |
| 2,574,931 | 11/51 | Nason | 222—95 |
| 2,618,409 | 11/52 | Eisenberger et al. | 222—95 |
| 2,722,171 | 11/55 | Deringer | 99—235 |
| 2,888,717 | 6/59 | Domitrovic | 99—235 |
| 3,076,403 | 2/63 | Behlen | 99—235 |

FOREIGN PATENTS

| 553,369 | 12/56 | Belgium. |
| 91,942 | 10/61 | Denmark. |
| 1,116,444 | 2/56 | France. |
| 342,780 | 1/60 | Switzerland. |

WALTER A. SCHEEL, *Primary Examiner.*